US009536329B2

(12) United States Patent
Saxena et al.

(10) Patent No.: US 9,536,329 B2
(45) Date of Patent: Jan. 3, 2017

(54) METHOD AND APPARATUS FOR PERFORMING SENTIMENT ANALYSIS BASED ON USER REACTIONS TO DISPLAYABLE CONTENT

(71) Applicant: Adobe Systems Incorporated, San Jose, CA (US)

(72) Inventors: Neha Saxena, New Delhi (IN); Pulkit Agarwal, Lucknow (IN); Raman Gupta, Bahadurgarh (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 272 days.

(21) Appl. No.: 14/291,910

(22) Filed: May 30, 2014

(65) Prior Publication Data

US 2015/0347903 A1    Dec. 3, 2015

(51) Int. Cl.
    *G06F 17/00*      (2006.01)
    *G06F 17/20*      (2006.01)
    *G06T 11/20*      (2006.01)

(52) U.S. Cl.
    CPC .................... *G06T 11/206* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,667,169 | B2* | 3/2014 | Patil | G06Q 30/02 370/229 |
| 8,868,964 | B2* | 10/2014 | Bagga | G06F 11/1479 714/4.1 |
| 9,419,948 | B2* | 8/2016 | Gupta | H04L 63/0428 |
| 9,425,076 | B2* | 8/2016 | Agarwal | H01L 21/67766 |
| 9,432,368 | B1* | 8/2016 | Saxena | H04L 63/0861 |

OTHER PUBLICATIONS

Designing a mobile bio-feedback device to support learning activities Hippokratis Apostolidis; Panagiotis Stylianidis Interactive Mobile Communication Technologies and Learning (IMCL), 2014 International Conference on Year: 2014 pp. 189-194, DOI: 10.1109/IMCTL.2014.7011129 IEEE Conference Publications.*

(Continued)

*Primary Examiner* — Michael B Holmes
(74) *Attorney, Agent, or Firm* — Keller Jolley Preece

(57) ABSTRACT

A computer implemented method and apparatus for acquiring sentiment analysis information based on user reactions to displayable content. The method comprises receiving reaction data of at least one individual user viewing portions of displayable content, wherein the reaction data of each user includes indications representative of at least one of a time-varying emotional state of the user and a time-varying level of interest of the user captured during viewing of the displayable content; and performing sentiment analysis on the reaction data by at least one of: categorizing portions of the displayable content based on one of the reaction of one user or aggregated reactions of a plurality of users, and identifying at least one portion of the displayable content having one of a more favorable and a less favorable reaction by the at least one user, by comparison to one of a baseline and reactions to other portions of the displayable content.

20 Claims, 9 Drawing Sheets

(56) References Cited

OTHER PUBLICATIONS

Self-Adaptive Prototype for Seat Adaption Gian Mario Bertolotti; Andrea Cristiani; Remo Lombardi; Marko Ribaric; Nikola Tomasevic; Mladen Stanojevic Self-Adaptive and Self-Organizing Systems Workshop (SASOW), 2010 Fourth IEEE International Conference on Year: 2010 pp. 136-141, DOI: 10.1109/SASOW.2010.29 IEEE Conference Publications.*

Recognition of facial expressions and measurement of levels of interest from video M. Yeasin; B. Bullot; R. Sharma IEEE Transactions on Multimedia Year: 2006, vol. 8, Issue: 3 pp. 500-508, DOI: 10.1109/TMM.2006.870737 IEEE Journals & Magazines.*

Computational Models of Players' Physiological-Based Emotional Reactions: A Digital Games Case Study Pedro A. Nogueira; Rúben Aguiar; Rui Rodrigues; Eugénio Oliveira Web Intelligence (WI) and Intelligent Agent Technologies (IAT), 2014 IEEE/WIC/ACM Intl. Joint Conf. on Year: 2014, vol. 3 pp. 278-285, DOI: 10.1109/WI-IAT.2014.178 IEEE.*

* cited by examiner

| VIDEO TIMELINE (IN SECONDS) | INDIVIDUAL USER REACTIONS | CONTENT ID |
|---|---|---|
| | USER REACTION(S) | |
| 0-30 | EYE BALLS GLARING | VIDEO 1 |
| 30-60 | EYE BALLS GLARING | VIDEO 1 |
| 60-90 | EYE BALLS GLARING, TEETH VISIBLE | VIDEO 1 |
| 90-120 | EYE BALLS GLARING | ADVERTISEMENT 1 |
| 120-150 | TEETH VISIBLE, SMILES | VIDEO 1 |
| 150-180 | TEETH VISIBLE | VIDEO 1 |
| 180-210 | EYE BALLS GLARING | VIDEO 1 |
| 210-240 | CLOSES HIS EYES | VIDEO 1 |
| 240-270 | EYES STILL CLOSED | ADVERTISEMENT 2 |
| 270-300 | TURNS AWAY HIS HEAD | ADVERTISEMENT 2 |
| 300-330 | HEAD STILL TURNED AWAY | VIDEO 1 |
| 330-360 | HEAD STILL TURNED AWAY | VIDEO 1 |
| 360-390 | FACING THE VIDEO, WITH EYE BALLS GLARING | ADVERTISEMENT 3 |
| 390-420 | EYE BALLS STILL GLARING | VIDEO 1 |
| 420-450 | STARTS CRYING | VIDEO 1 |
| 250-480 | STILL CRYING | VIDEO 1 |
| 480-510 | STILL CRYING | VIDEO 1 |
| 510-540 | STILL CRYING | VIDEO 1 |
| 540-570 | SMILES | VIDEO 1 |
| 570-600 | SMILES | VIDEO 1 |

FIG. 2C

AGGREGATED USER REACTIONS

| VIDEO TIMELINE (SECONDS) | PROMINENT USER REACTION | DETAILED USER REACTION | CONTENT ID | DEMOGRAPHIC* |
|---|---|---|---|---|
| 0-30 | TURNS AWAY HEAD | TURNS AWAY HEAD (70%) EYE BALLS GLARING (25%) TEETH VISIBLE (5%) | VIDEO 1 | AGE = 25-30 GENDER = F PLACE = NEW DELHI, INDIA |
| 30-60 | EYE BALLS GLARING | TURNS AWAY HEAD (30%) EYE BALLS GLARING (55%) TEETH VISIBLE (5%) | VIDEO 1 | AGE = 25-30 GENDER = F PLACE = NEW DELHI, INDIA |
| 60-90 | EYE BALLS GLARING | TURNS AWAY HEAD (15%) EYE BALLS GLARING (85%) | VIDEO 1 | AGE = 25-30 GENDER = F PLACE = NEW DELHI, INDIA |
| 90-120 | TURNS AWAY HEAD | HEAD STILL TURNED AWAY (78%) EYE BALLS GLARING (22%) | AD # 1 | AGE = 25-30 GENDER = M PLACE = NEW DELHI, INDIA |
| 120-150 | TURNS AWAY HEAD | TURNS AWAY HEAD (70%) EYE BALLS GLARING (25%) TEETH VISIBLE (5%) | VIDEO 1 | AGE = 25-30 GENDER = M PLACE = NEW DELHI, INDIA |

FIG. 2D

| VIDEO PORTION (TIME IN SECONDS) | USER REACTION | INTEREST INDEX | CONTENT ID |
|---|---|---|---|
| 0-30 | EYE BALLS GLARING | +10 | VIDEO 1 |
| 30-60 | EYE BALLS GLARING | +10 | VIDEO 1 |
| 60-90 | EYE BALLS GLARING | +10 | VIDEO 1 |
| 90-120 | EYE BALLS GLARING | +10 | ADVERTISEMENT 1 |
| 120-150 | TEETH VISIBLE | +10 | VIDEO 1 |
| 150-180 | TEETH VISIBLE | +10 | VIDEO 1 |
| 180-210 | EYE BALLS GLARING | +10 | VIDEO 1 |
| 210-240 | CLOSES HIS EYES | -10 | VIDEO 1 |
| 240-270 | EYES STILL CLOSED | -10 | ADVERTISEMENT 2 |
| 270-300 | TURNS AWAY HIS HEAD | -10 | ADVERTISEMENT 2 |

400

402

| VIDEO PORTION (TIME IN SECONDS) | USER REACTION | INTEREST INDEX | CONTENT ID |
|---|---|---|---|
| 0-30 | TURNS AWAY HIS HEAD | -10 | VIDEO 1 |
| 30-60 | EYE BALLS GLARING | +10 | VIDEO 1 |
| 60-90 | EYE BALLS GLARING | +10 | VIDEO 1 |
| 90-120 | EYE BALLS GLARING | +10 | ADVERTISEMENT 1 |
| 120-150 | TEETH VISIBLE | +10 | VIDEO 1 |
| 150-180 | TEETH VISIBLE | +10 | VIDEO 1 |
| 180-210 | TEETH VISIBLE | +10 | VIDEO 1 |
| 210-240 | EYE BALLS GLARING | +10 | VIDEO 1 |
| 240-270 | EYE BALLS STILL GLARING | +10 | ADVERTISEMENT 2 |
| 270-300 | TURNS AWAY HIS HEAD | -10 | ADVERTISEMENT 2 |

404

| VIDEO PORTION (TIME IN SECONDS) | USER REACTION | INTEREST INDEX | CONTENT ID |
|---|---|---|---|
| 0-30 | EYE BALLS GLARING | +10 | VIDEO 1 |
| 30-60 | EYE BALLS GLARING | +10 | VIDEO 1 |
| 60-90 | EYE BALLS GLARING | +10 | VIDEO 1 |
| 90-120 | EYES CLOSED | -10 | ADVERTISEMENT 1 |
| 120-150 | LIPS STRETCHED | +10 | VIDEO 1 |
| 150-180 | TEETH VISIBLE | +10 | VIDEO 1 |
| 180-210 | TEETH VISIBLE | +10 | VIDEO 1 |
| 210-240 | EYE BALLS GLARING | +10 | VIDEO 1 |
| 240-270 | TURNS AWAY HIS HEAD | -10 | ADVERTISEMENT 2 |
| 270-300 | TURNS AWAY HIS HEAD | -10 | ADVERTISEMENT 2 |

METHOD AND APPARATUS FOR PERFORMING SENTIMENT ANALYSIS BASED ON USER REACTIONS TO DISPLAYABLE CONTENT

BACKGROUND OF THE INVENTION

Field of the Invention

Embodiments of the present invention generally relate to sentiment analysis and, more particularly, to techniques for and analyzing the reactions of multiple users to the same portions of the same displayable content.

Description of the Related Art

Currently, users rate displayable content comprising video, as a whole. The ratings submitted by individual users of a community of users may be aggregated and shared with subsequent users of the same displayable content. The rating submitted by an individual user is typically a generic "like" or "dislike". However, realistically, a user does not like an entire video or dislike an entire video. Rather, a user likes one or more portions of the video while disliking other portions of the video. In fact, the user may like one portion of the video more than another portion. However, requesting that a user spend time rating portions of video is intrusive and time consuming. Therefore, there is a need for a method and apparatus for identifying a level of interest for multiple portions of a video based on user reactions.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for acquiring sentiment analysis information based on user reactions to displayable content is described. The method comprises receiving reaction data of one or more individual users who have viewed the same portions of displayable content. The reaction data includes indications representative of each user's time-varying emotional state, the user's time-varying level of interest, or both of these. The indications are derived, at least in part, from user image data captured during viewing of the displayable content. According to some embodiments, the method further comprises aggregating the reaction data of a plurality of users to obtain aggregated reaction data. Sentiment analysis is performed on the reaction data of one user or on the aggregated reaction data from the plurality of users. Sentiment analysis includes categorizing portions of the displayable content based on the individual reactions of one user or based on the aggregated reactions of the plurality of users. Alternatively, sentiment analysis includes determining whether one user or the plurality of users react positively or negatively to certain portions of the displayable content.

Each user's reactions are monitored by an image capture device such as a camera. Where the users are remotely distributed or viewing the displayable content at different times, a separate image capture device is associated with each user. An indicium corresponding to a user's level of interest, in relation to an identifiable portion of the displayable content, is sent to a server. According to some embodiments, indicia of interest of each user are generated for each portion of the video based on an interest index.

In another embodiment, an apparatus for identifying a level of interest for multiple portions of a video based on user reactions is described. The apparatus comprises a reaction data file that comprises an interest index of a user for each portion of a video. The interest index is calculated based on a user's reaction to a portion of the video. The user's reaction is monitored by a camera. The apparatus also comprises an interest index analyzer for generating indicia of interest of the user for each portion of the video based on the interest index, where the indicia of interest for each portion of the video is displayed when the video is played.

In yet another embodiment, a computer readable medium for identifying a level of interest for multiple portions of a video based on user reactions is described. The computer readable medium stores computer instructions that, when executed by at least one processor causes the at least one processor to perform the method for identifying a level of interest of the user for each portion of a video based on user reactions.

BRIEF DESCRIPTION OF THE DRAWINGS

FIG. 2C is a tabular representation of time indexed reaction data acquired, according to some embodiments, from a representative viewer of an accessed video along with socio-demographic data applicable to the viewer;

FIG. 2D is a tabular representation of the aggregated reaction data of many users, according to some embodiments;

FIG. 4 illustrates a sample of data collected for three users of a video in accordance with an embodiment of the present invention;

Figure 1:
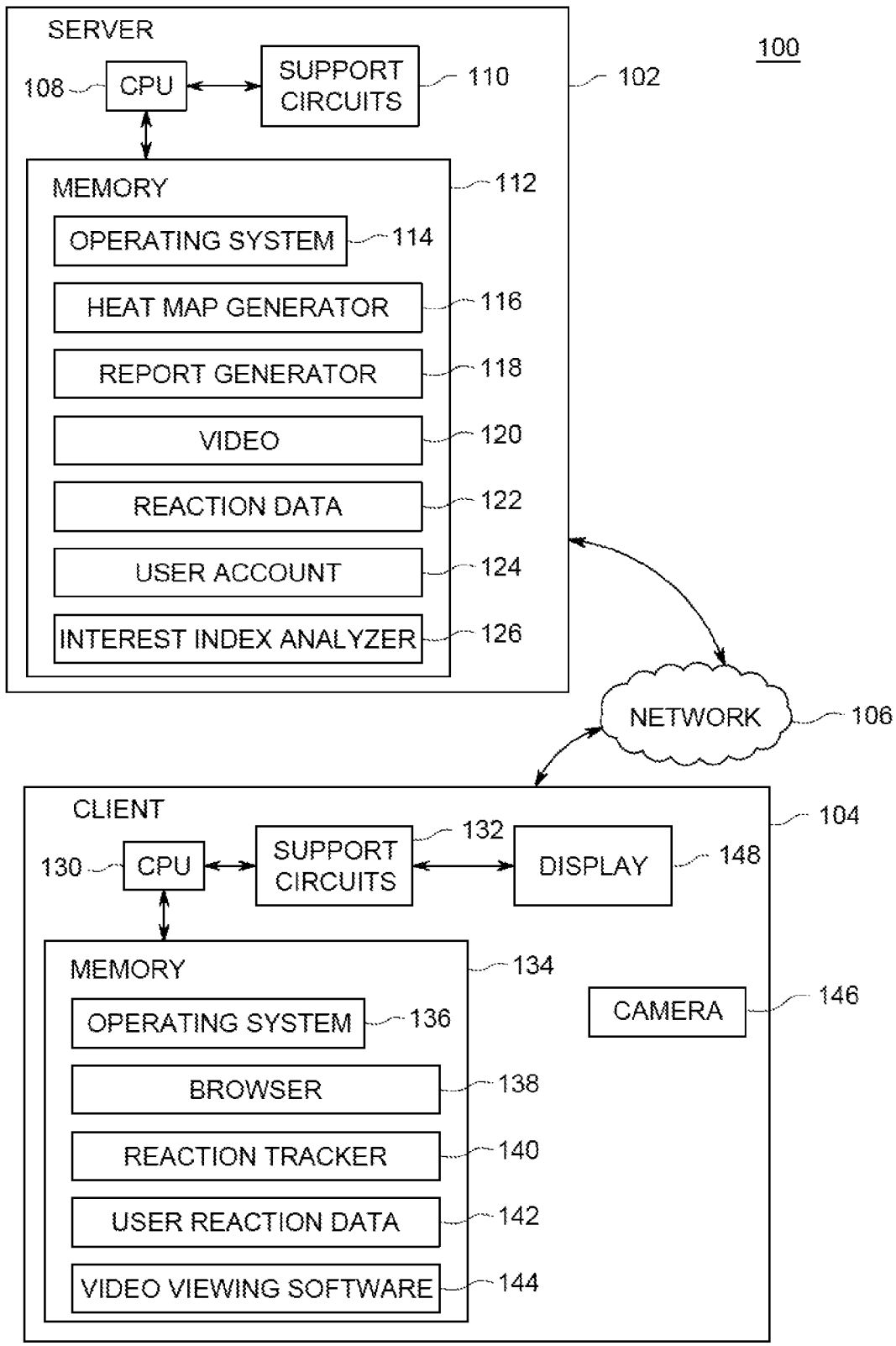
FIG. 1 is a block diagram of a system for identifying and/or analyzing one or more portions of displayable content, such as videos, based on user reactions such as those indicative of emotional state and/or level of interest, according to one or more embodiments.

While the method and apparatus is described herein by way of example for several embodiments and illustrative drawings, those skilled in the art will recognize that the method and apparatus for identifying a level of interest for multiple portions of a video based on user reactions is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for identifying a level of interest for multiple portions of a video based on user reactions defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Techniques are disclosed for performing sentiment analysis based on the individual reactions of one user to portions of displayable content or, alternatively, aggregating the reactions of multiple users to identical portions of the same displayable content. According to some embodiments, the displayable content is a video. According to other embodiments, the displayable content includes video, multimedia files, and software client applications which comprise synchronized video and audio segments. The displayable content may, in fact, be any content which is rendered to a display about which useful information can be acquired by observing and detecting user reactions over time. According to some embodiments, however, displayable content is excluded from analysis if it is presented statically (i.e. such that the content itself does not change with respect to time while being viewed by the user).

Through indexing of the displayable content, the reactions of all users can be identified with respect to any particular portion of the content—even if such viewing is time shifted or interrupted. The users are typically dispersed geographically and viewing the content independently of one another, though this is not necessarily the case. Reactions of an individual user to portions of displayable content are classified by recognizing a contemporaneous transition to and from at least one emotional state or facial feature of the user. In some cases, a transition marks a change (i.e., an increase or decrease) in a user's level of interest while a particular portion of the displayable content is being viewed. In other cases, a transition is indicative of the user's emotional state while a particular portion of the displayable content is being viewed. The characteristics which are captured and classified according to some embodiments of the invention are visually perceptible characteristics such as facial expressions and other transitory facial features such as gaze direction. In some embodiments, audibly perceptible characteristics such as volume, tone of voice, laughing, are also captured and classified, according to known and conventional techniques.

The reactions of individual users are captured at each location where the displayable content is being viewed by those users. In the interest of privacy and anonymity, the captured reactions can be classified locally, as well, so that no images or other user personal identifiable information need be transmitted or stored at a central server. As such, only the classified user reaction data is forwarded to and received by a server for storage and/or processing. Of course, with appropriate encryption techniques and prior consent of users, locally captured reactions may be sent to and received by the server in "raw" form (i.e., prior to classification). In such embodiments, classification is performed at the server before storage and/or aggregation.

Each user's reactions are monitored by an image capture device such as a camera. Where the users are remotely distributed or viewing the displayable content at different times, a separate image capture device is associated with each user. An indicium corresponding to a user's level of interest, in relation to an identifiable portion of the displayable content, is sent to a server. According to some embodiments, indicia of interest of each user are generated for each portion of the video based on an interest index.

Reaction data of many users are received and aggregated at a server to accommodate sentiment analysis. From this aggregated data, useful insights are provided to such diverse entities as advertisers, producers of video content, publishers of multimedia content, and even video game developers. According to some embodiments of the invention, when a user views the displayable content via a user device, a camera or other suitable image capture device monitors the user's reactions. A user's reactions are interpreted based on the user's eye movements, head movements and facial expressions. The user's reactions are monitored by the camera while the user watches the video. An interest index is calculated for multiple portions, for example, one-second increments of the video. The interest index is based on the user reaction. User reactions include, but are not limited to, turning a user's head away from the video, closing the user's eyes, watching the video with eyes wide open, and the like. Reactions also include changes in facial expression that are interpreted to convey happiness, anger, sadness, and the like.

According to some embodiments, a predefined point value is assigned to each reaction. For example, watching the video with eyes wide open may be allotted a point value of +10.0, while a change in facial expression may be allotted a point value of +10.0. If two or more reactions are observed during a given second of the video, the reactions point values are combined. For example, if the user watches the video with his eyes wide open and changes his facial expression, the second of video where the user had these reactions is allotted a point value of +20.0.

According to other embodiments, sets of reactions across a plurality of users are correlated to respective portions of a video, and the most common reaction exhibited by the users to each portion of the video is determined to be the "correct" response to that portion. In such "crowd sourcing" embodiments, the reaction determined to be correct is correlated or validated against various characteristics or parameters associated with the video. For example, if the response observed in the majority of viewers was a smile, but the scene was, in fact, a sad scene according to an a priori characterization offered by the content producer(s) or creator(s), then the crowd-sourced reaction may be identified as an outlier and highlighter for further review and analysis by a video creator, advertisers, and other interested parties. Likewise, if the crowd-sourced reaction was such that the majority of viewers turned away their head for a particular advertisement, then the diagnostic value of this reaction can be further validated (or invalidated, as the case may be) based on a comparison of the category of the show tp the nature of the product being advertised. If, for example, an advertisement for a product targeted at adults were shown during a show categorized as being for children, then this would tend to validate the diagnostic value of the crowd sourced reaction.

According to some embodiments, refinements to the crowdsourcing approach outlined above are employed. For example, the reactions of one user are combined with the reactions of other users who have viewed the video as described above. As a subsequent user views the video, an indication of an aggregate interest index for each portion of the video is provided to the subsequent user. According to other embodiments, the group of users comprises a panel having socio-demographic characteristics representative of a broader community of users. An aggregate interest index corresponding to one or more socio-demographic groups within a user community of interest is presented to an interested decision-maker such, for example, as an advertiser or media publisher. Access to aggregate interest index is granted on a subscription or pay-per-report basis. Thus, while an advertisement for products intended for adults might evoke a lack of interest on the part of children at whom a video was targeted (as evidenced by heads turning away), it may very well turn out that the fraction of the adults watching the same video were highly interested in the advertisement (as may be evidenced by stopping talking, eyes wide and starting directly at the display). In such cases, an advertiser may very well determine that a particular campaign was successful.

In some embodiments, a heat map is generated that identifies the interest of each portion of the video based on the reactions of all prior viewers whose reactions were captured and analyzed.

As previously explained, existing solutions enable users to rate a video using a binary "like" or "dislike" opinion that applies to the video as a whole. However, there are nontrivial issues associated with those solutions. For instance, a user is not able to rate individual time portions of the video. In addition, if the user were given the ability to rate individual time portions of the video, the act of rating the video, portion by portion, would be intrusive to the user.

Thus, and in accordance with an embodiment of the present invention, techniques are provided herein that allow for identifying a level of interest for multiple portions of a video based on user reactions as monitored using a camera. When a user views a video, a camera generates images that are used to identify reactions of the user while viewing the video. The user reaction is taken periodically, for example, each second. User reactions include, but are not limited to, eye movements, head movements, and changes in facial expression. Each user reaction, whether positive or negative has a predefined point value. A total point value, hereafter referred to as an interest index, is calculated for each portion of video. For example, the reaction of a user turning his head has a point value of −10.0. The reaction of a user watching the video with eyes wide open has a point value of +10.0. The reaction of a user changing his facial expression has a point value of +10.0. For a given second of the video, if the user watches the video with eyes wide open and changes his facial expression, the total point value is 10.0+10.0=20.0. Hence, the interest index for the given second of video for the user is 20.0. An interest index is calculated for each portion of the video. The interest indices are sent to a server and stored with the video.

When a subsequent user, whether the user is an average viewer, an advertiser, or a video content creator, requests to view the video, the stored interest indices are consolidated. The interest index of each portion of the video is averaged for all viewers who have previously viewed the video. Upon playback of the video, an indication of an average interest index is provided to the subsequent user. In some embodiments, a heat map is generated for the video based on the averaged interest indices. In one embodiment, the heat map is a graphical representation of the interest indices that uses color-coding to represent an interest index for each portion of the video. For example, the heat map may include varying shades of red and green, red for negative interest indices and green for positive interest indices, where a shade of the red or green identifies a magnitude of interest.

In one example, a thirty-five second video shows an empty street for ten seconds, followed by a twenty second car chase through the street, and ending with a crash in the last five seconds of video. In the present example, viewers paid little attention during the ten seconds when the empty street was shown, resulting in an average interest index of 5.0 for the first three seconds, and an average interest index of −10.0 for the last seven seconds. When the car chase began, users were slowly drawn back to video to view the car chase. The first two seconds of the car chase resulted in an average interest index of 5.0, while the next ten seconds of the car chase resulted in an average interest index of 10.0. The users viewing the video began to lose interest in the car chase during the last three seconds, resulting in an average interest index of 5.0 for the last three seconds of the car chase. The car crash then suddenly brought users' full attention back to the video, resulting in an interest index of 15.0 for the entire five seconds of the crash. In some embodiments, a heat map generated for the video is displayed below the video as it plays. In the present example, the heat map shows a light green color for the first three seconds of the video when the user begins watching the video. During the seven seconds of video of the empty street, the heat map shows a light red color. During the first two seconds of the car chase, the heat map shows the light green color, but during the next ten seconds, when the viewers are drawn back to the car chase, the heat map shows a darker shade of green. During the last three seconds of the car chase, the heat map shows the lighter green. For the final five seconds, where users watched the car crash intently, the heat map shows an intense dark green to indicate a high interest in the last five seconds of video.

Advantageously, the present application may be implemented as a browser plug-in. Applications such as ADOBE Media Player or Flash Player can save a user time when watching a long video. The generated heat map identifies more interesting portions of the video in order to allow the user to skip through the most interesting portions. Applications such as ADOBE SiteCatalyst or Primetime/Video Advertising can use the heat map to identify a most watched part of a video to identify locations for ad placement. Alternatively, if the video includes an advertisement, the heat map enables advertisers to identify interest levels of users during advertisements. Knowing how users react to their advertisements allows advertisers to create better advertisements. A provider of the video content can use the heat map to generate highlights of the video, where the highlights include the most interesting portions of the video.

Various embodiments of a method and apparatus for identifying a level of interest for multiple portions of a video based on user reactions are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for identifying a level of interest for multiple portions of a video based on user reactions and for classifying and aggregating user reactions to such portions, according to one or more embodiments. The system 100 includes a server 102 and a client 104, communicatively coupled to one another via a network 106. The server 102 is a computing device, for example a desktop computer, laptop, tablet computer, and the like. In some embodiments, the server 102 is a cloud based server e.g., a blade server, virtual machine, and the like. The server 102 includes a Central Processing Unit (CPU) 108, support circuits 110, and a memory 112. The CPU 108 may include one or more commercially available microprocessors or microcontrollers that facilitate data processing and storage. The various support circuits 110 facilitate the operation of the CPU 108 and include one or more clock circuits, power supplies, cache, input/output circuits, and the like. The memory 112 includes at least one of Read Only Memory (ROM), Random Access Memory (RAM), disk drive storage, optical storage, removable storage and/or the like.

The memory 112 includes an operating system 114, a heat map generator 116, a report generator 118, a video 120, reaction data 122, and an interest index analyzer 126. The operating system 114 may include various commercially known operating systems. In some embodiments, the server 102 includes user accounts 124.

The client 104 is a computing device, for example a desktop computer, laptop, tablet computer, smartphone, and the like. The client 104 includes a Central Processing Unit (CPU) 130, support circuits 132, a memory 134, a camera 146 and a display 148. In some embodiments, the camera 146 is separate from the client 104. The CPU 130 may include one or more commercially available microprocessors or microcontrollers that facilitate data processing and storage. The various support circuits 132 facilitate the operation of the CPU 130 and include one or more clock circuits, power supplies, cache, input/output circuits, and the like. The memory 134 includes at least one of Read Only Memory (ROM), Random Access Memory (RAM), disk drive storage, optical storage, removable storage and/or the like.

The memory 134 includes an operating system 136, a browser 138, a reaction tracker 140, user reaction data 142, and video viewing software 144. The operating system 136 may include various commercially known operating systems. Video viewing software includes software such as ADOBE® Media Player, FLASH® Player, or the like, capable of playing video content. The reaction tracker 140 is a plug-in to the browser 138. The reaction tracker 140 monitors user eye movement, head movement, and changes in facial expression monitored by the camera 146.

The network 106 includes a communication system that connects computers (or devices) by wire, cable, fiber optic and/or wireless link facilitated by various types of well-known network elements, such as hubs, switches, routers, and the like. The network 106 may be a part of the Intranet using various communications infrastructure, such as Ethernet, Wi-Fi, a personal area network (PAN), a wireless PAN, Bluetooth, Near field communication, and the like.

A user accesses the video 120 on the display 148. In some embodiments, the video 120 is accessed via the browser 138. In some embodiments, the video 120 is accessed by a media player, for example ADOBE® Media Player, FLASH® Player, and the like. In some embodiments, the user is asked to sign into the server 102 or to create a user account if one does not already exist. If the user has a user account 124 on the server 102, then user information stored in the user account 124 can be used to identify the user whose reaction is tracked. The reaction tracker 140 monitors user eye movements, head movements, and changes in facial expression monitored by the camera 146 while the user views the displayed video 120. The camera 146 generates images of the user. The reaction tracker 140 uses face detection and motion detection to identify the user's reaction based on, for example, changes in the user's eyes, lips, and chin in the generated images.

According to some embodiments, the reactions are captured, analyzed, identified, and indexed with respect to time. By noting both the nature of the user's reaction and at what point during accessing the displayable content that it occurred, it is possible to aggregate the responses many users and gain further insights (as well be described in detail, shortly). To this end, the indexed reaction data is transmitted to a server for aggregation and analysis.

According to some embodiments, respective user reactions to corresponding portions of the displayable content have associated point value scores. This point value system enables a user's level of interest and/or emotional state to be objectively characterized and, for example, aggregated with the reactions of other users. Point values are predefined for each user reaction. For example, open eyes have a point value of 10.0. Teeth visible have a point value of 10.0. Head turned away has a point value of −10.0. Crying has a point value of 10.0. Smiling has a point value of 10.0. Closed eyes have a point value of −10.0. Any point values may be predefined such that user reactions that indicate engagement with the video have higher point values than user reactions that indicate a lack of interest in the video 120.

For each portion of the video 120 viewed by the user, the reaction tracker 140 calculates an interest index. The reaction tracker 140 may calculate the interest index for any time portion of the video 120, for example, for every second of video, every ten seconds of video, every thirty seconds of video, or any level of granularity that may be useful. The reaction tracker 140 calculates the interest index by totaling the point values for each user reaction identified in a video portion. For example, if in a ten second portion of video, the user watches the video with open eyes and then smiles, the interest index for the video portion is 10.0+10.0=20.0. In some embodiments, the reaction tracker 140 stores the interest index and a time stamp or time portion of the video associated with the interest index as user reaction data 142. In some embodiments, the reaction tracker 140 also stores the actual user reaction, for example, "Smiles, eyes open" in addition to what content was being viewed, such as "video", "advertisement 1", "advertisement 2", and the like as the user reaction data 142.

When the user stops watching the video 120, the reaction tracker 140 sends the user reaction data 142 to the server 102 via network 106. The reaction tracker 140 may send the information in the user reaction data 142 in any form, such as a JAVASCRIPT Object Notation (JSON) object, an Extensible Markup Language (XML) file, or the like. The information is stored as reaction data 122 on the server 102. User information from the user account 124 may be stored in the reaction data 122. User information may include, but is not limited to country, age, gender, and the like.

When a subsequent user views the video 120 a crowd-sourced analysis is performed. The index analyzer 126 consolidates the reaction data 122 of prior user views for the video 120. The index analyzer 126 calculates an average of the interest indices for each portion of the video 120 for all previous users whose reactions are stored as reaction data 122. The index analyzer 126 provides indicia of interest based on the average interest index. In some embodiments, the heat map generator 116 creates a heat map to represent the average interest indices for each portion of the video 120. In some embodiments, the heat map is a graphical representation of the interest indices. In some embodiments, the heat map uses color-coding to represent an average interest index for each portion of the video; however any graphical representation of levels of interest may be used. For example, the heat map may include varying shades of red and green, red for negative interest indices and green for positive interest indices, where a shade of the red or green identifies a magnitude of interest. In some embodiments, during playback of the video, the heat map is displayed along with the video 120 to identify which portions of the video previous users found interesting and which portions of the video were found less interesting. Users may use the heat map to advance to more interesting portions of the video 120.

In some embodiments, the report generator 118 uses the aggregated reaction data 122 to generate a table or a graph that depicts where interest levels are high or low in the video. Advertisers can use the interest levels of different portions of the video 120 as well as the advertising content that the advertiser may have included with the video 120. Alternatively, advertisers can use the interest levels of different portions of the video 120 to identify where in the video to place advertising content, specifically where the interest level is high.

According to some embodiments, advertisers capture viewer reactions to their own content prior to launching an ad campaign. Report generator 118 uses the aggregated reaction data 122 to correlate crowd-sourced reactions to specific portions of a video 120, the video 120 in this example being an advertisement for which the advertiser has identified, a priori, an intended effect (humor, surprise, empathy) which may be thought of as audience touch points needed to establish goodwill and successfully deliver a message which will cause the viewer to take action (i.e., purchase a product). The report identifies whether the audience reaction was consistent with the intended effect (e.g., whether the majority laughed at the right time, etc.) and thus whether the touch point objectives were met. Other information in the report generated by report generator 118 includes whether the reaction is consistent with other predefined variables (viewer characteristics, the show into which ad was inserted, etc.). By reference to whether audience "touch point" objectives were met by a particular advertisement, the advertiser is able to hold the responsible agency accountable. This may mean renegotiating a contract with the agency itself, selecting a different medium and/or genre within which to place the same advertisement, or withholding a "bonus" portion of payment to the agency.

Figure 2A:
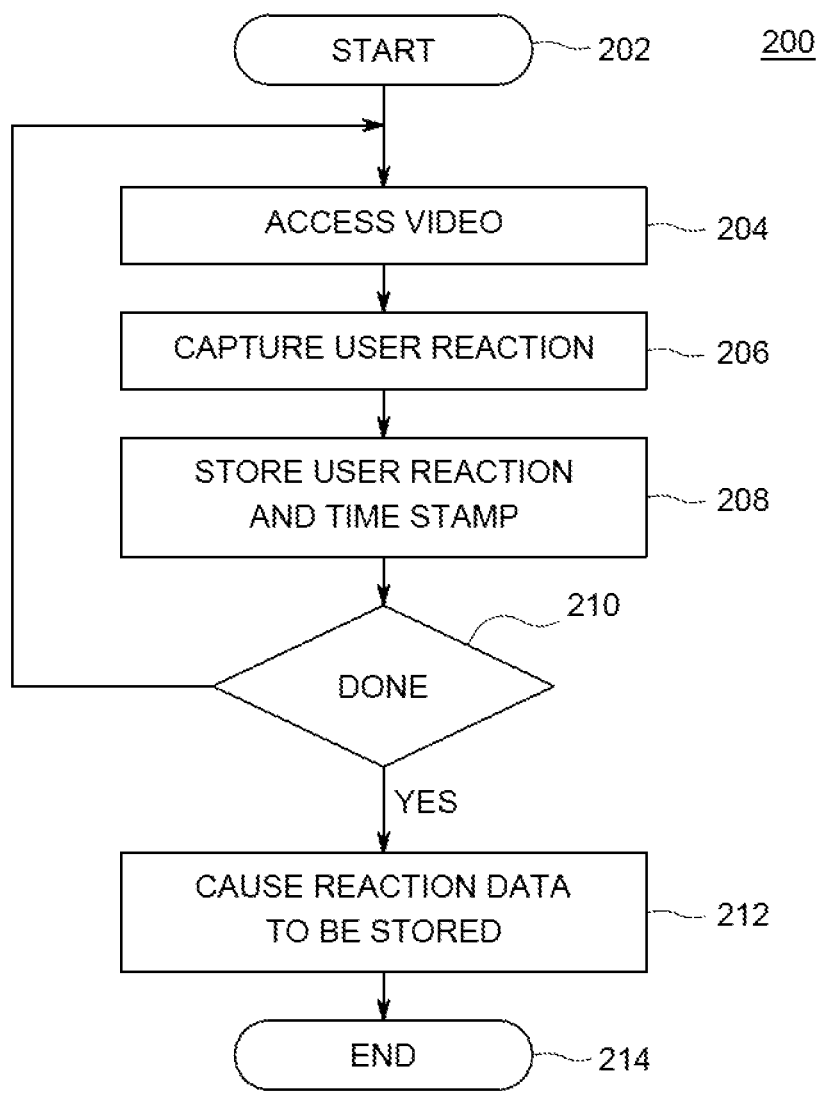
FIG. 2A depicts a flow diagram of a method for identifying a level of interest for multiple portions of displayable content, such as a video, based on user reactions as performed by the reaction tracker of FIG. 1, according to one or more embodiments.

FIG. 2A depicts a flow diagram of a method 200 for identifying a level of interest for multiple portions of a video based on user reactions as performed by the reaction tracker 140 of FIG. 1, according to one or more embodiments. The method 200 monitors images from a camera while a user is viewing a video and identifies a level of interest in a portion of video based on the user reactions identified from images generated by the camera. The method 200 starts at step 202 and proceeds to step 204.

At step 204, the method 200 accesses a video. The video is on a server, for example, a content server. In some embodiments, the video is only available to subscribers on the server. In such embodiments, the subscriber, hereafter referred to as user, is asked to sign into the server in order to verify the user is permitted to view the video.

The method 200 proceeds to step 206, where the method 200 captures a user reaction from an image capture device such as a camera. The camera monitors user reactions. In some embodiments, the method 200 uses a video output from a camera to identify reactions of the user. In some embodiments, the method 200 uses a series of images generated by the camera to identify reactions of the user. The method 200 uses face detection and motion detection to identify the user's reaction based on, for example, changes in one or more user facial features which are associated with a user's emotional state or level of interest. The facial features include the user's eyes, lips, chin, and teeth in the generated images or video output.

In some embodiments, the reactions are identified by type and an indication of the reaction type with a time stamp for association with portions of the video is transmitted for a server. Examples of user reaction types include eye balls glaring, teeth visible, eyes closed, head turned away from display, gaze direction away from the display, and lips stretched. The server processes the received indications of user reaction to calculate a user index with respect to portions of the viewed video. In other embodiments, the user index score is calculated locally and sent as the indications to the server for aggregation with user indices of other users.

The method 200 associates each reaction to a level of interest in a portion of the video. The user reaction is identified periodically, for example, each second. The method 200 identifies eye movements, head movements, and changes in facial expression. Each eye movement, head movement, and change in facial expression is associated with a point value. A high point value indicates a high level of interest. For example, eyes open while facing the video indicates as a high level of interest, and may be assigned a point value of +10.0. Turning head away from the video indicates a low level of interest, and may be assigned a point value of −10.0. Smiling may be assigned a point value of +10.0.

The method 200 proceeds to step 208, where the method 200 calculates and stores an interest index for a portion of video. The method 200 identifies all user reactions for a portion of video. A length of a portion of video is predefined. In one embodiment, the length of a portion of video may be one second. In another embodiment, the length of a portion of video may be thirty seconds. For example, when the portion of video is one second, the method 200 for example, identifies the user is facing the video with their eyes open. For that one second portion of the video, the interest index is +10.0. Where the portion of video is ten seconds long and the method 200 for example, identifies that the user is facing the video with their eyes open and then smiles, the method 200 calculates the interest index to be +20.0. The method 200 stores at least the calculated interest index along with a time stamp or time interval for the portion of video. The method 200 optionally stores the type of content in the portion of video, for example, "video", "advertisement 1", "advertisement 2", and the like as well as the user reaction, for example "facing video with eyes open".

The method 200 proceeds to step 210, where the method 200 determines whether the user is done viewing the video. If the method 200 determines that the user is done viewing the video, the method 200 proceeds to step 212. However, if at step 210, the method 200 determines that the user is not done viewing the video, then the method 200 proceeds to step 206, where the method 200 iterates until the user is done viewing the video at which time the method 200 proceeds to step 212.

At step 212, the method 200 causes the user reaction data to be stored on the server. A representative example of the user reaction data captured and caused to be stored for a single viewer according to the method 200 is shown in FIG. 2C. The method 200 facilitates sending the user reaction data to the server where the server uses the user reaction data to identify a level of interest for each portion of a video based on user reactions. The method 200 proceeds to step 214 and ends.

Figure 2B:
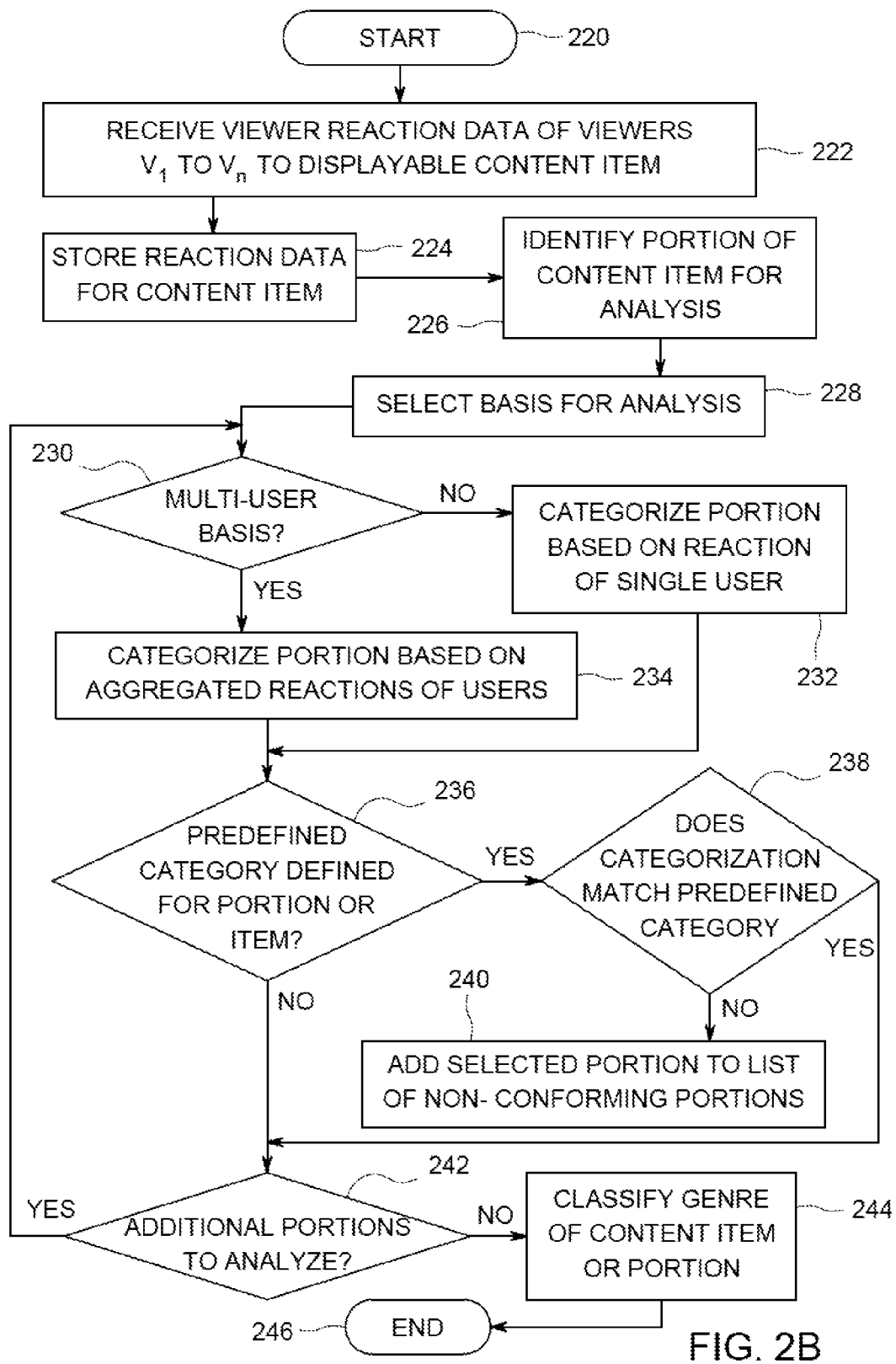
FIG. 2B depicts a flow diagram of a method for characterizing portions of a video, or for characterizing a video as unified body of work, according to one or more embodiments.
Figure 3:
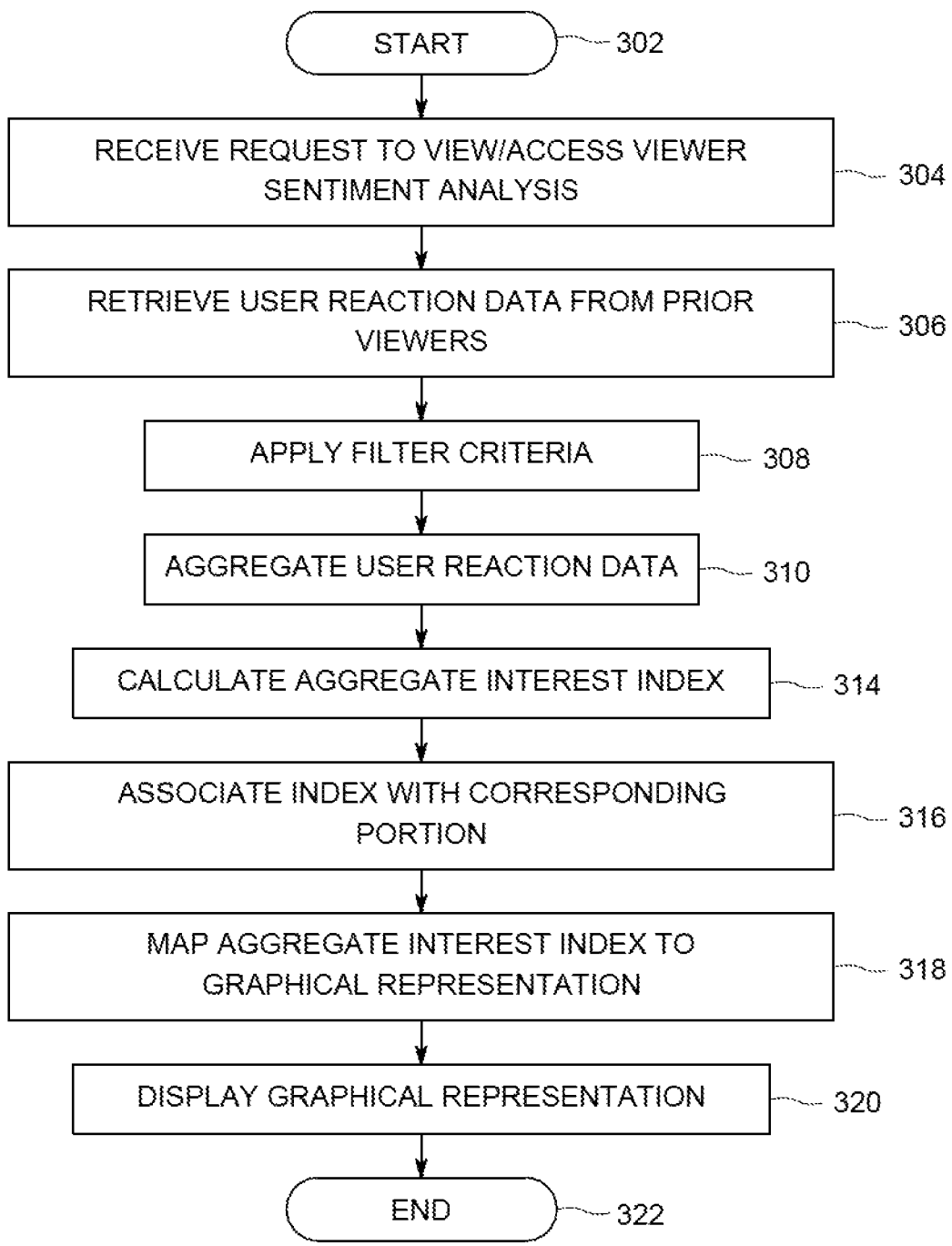
FIG. 3 depicts a flow diagram of a method for using aggregate user reaction data collected while users viewed a video, as performed by the heat map generator and report generator of FIG. 1, according to one or more embodiments.

FIG. 2B depicts a flow diagram of a method for using received user reaction data 122, as captured and identified by embodiments of client 104 for FIG. 1, for identifying and, optionally, using a crowd-sourcing approach to characterize specific portions of displayable content and/or the work as a whole. Before proceeding, it should be emphasized that the collection, analysis and reporting of user reaction data, as exemplified by FIG. 3, is not limited to crowd-sourced sentiment analysis (requiring the aggregation of user data from many users). That is, the processes described herein are equally applicable to situations in which sentiment analysis is to be based on the reaction data of a single user. An individual content owner, for example, might be interested in observing a specific content consumer for any reason. As one example, a student's recommendation (e.g., of a video course or lesson) may be evaluated by his teacher by reference to sentiment analysis using that particular student's reaction data. Likewise, a particular consumer's recommendation or review of a product advertisement or video demonstration might be evaluated by reference to sentiment analysis based on that particular consumer's reaction data. By way of still further example, a content owner or sponsor may specify a randomly selected individual user by reference to a set of socio-demographic characteristics (age, gender, income, and residence location). In other cases, sentiment analysis can be performed and updated over time as user reaction data is accumulated. Initial analysis may be based on a data set consisting of the reaction data of a single user. As additional user reaction data is acquired from subsequent viewers of the same portions of the display content, crowd sourcing becomes practicable and can commence.

In any event, and as shown in FIG. 2B, the method is entered at 220 and proceeds to step 222 where it receives viewer reaction data from a plurality of viewers, each of whom are represented by an anonymous identifier as $V_1$ to $V_n$. According to some embodiments, the reaction data received at step 222 further includes socio-demographic data associated with the corresponding user. This may include, for example, age, gender, income range, zip code, and any other data which a user may make available as, for example, when accessing the applicable display content. At step 224, the anonymized data is stored in a database so that its contents are available to those with authorized access to the report generating capabilities of server 102.

The method proceeds to step 226. According to some embodiments, a user accessing the resources of server 102, identifies, at step 226, a portion of a video for analysis. The portion selected may, for example, be an entire video, or it may be a single portion of the video. According to alternate embodiments, the method automatically identifies, at step 226, each portion of the video for which a user reaction has been captured. An illustrative tabular representation of the manner in which user reaction data for all identified reaction events is aggregated, according to such alternate embodiments, is shown in FIG. 2D. According to hybrid embodiments, a graphical representation of a timeline and scene screen shot coinciding with times at which user reactions identified (e.g., at the individual level, or in the aggregate based, for example, on a number or fraction of viewers above a threshold, etc.) were captured for the video.

The reactions of all or a majority of users need not be the same to trigger inclusion in the indexed, screen shot time line presented to the user according to hybrid embodiments. It suffices to say that the more information offered to a user, the more flexibility he or she will have in obtaining the kinds of insight which will enable better advertising placement and/or campaign go/no go decisions (with respect to advertisers) and scene editing decisions (with respect to producers of creative content).

The type and/or basis for analysis is specified by the user at step 228. According to some embodiments, the user may wish to gain insight into whether one or all viewers exhibited a reaction consistent with the intended impact of a particular scene or portion of an advertising message. Thus, at step 226 a user may specific a time range which defines the portion of the display content corresponding to each scene or portion of an advertising message that is of interest. Likewise, at step 228, a user defining "content corroboration" as the basis for analysis may be further prompted to specify a predefined category for each scene identified at block 226. By way of alternate example, a user may specify a desire to classify the entire work as a whole, rather than the individual scenes which comprise it. In such case, analysis of the individual scenes is still required but it is inferred, so the user can instead be prompted to specify the overall genre classification (action adventure, romantic comedy, documentary, and the like) without providing a discrete classification for each defined scene. According to some embodiments, a genre classification is assigned to a work based on the predominant (as measured by length of time or number of detected instances) reaction of a majority of those who accessed it.

Additional criteria can also be specified at step 228 according to embodiments of the invention. Among the criteria a user may specify are whether or not analysis is to proceed on the basis of reaction data from one user, or from many users. Further criteria which may be specified include any of the exemplary socio-demographic criteria identified above as well as a temporal restriction (e.g., the last n users to have accessed the content, or those who accessed the content in the past n months, where n is a user selectable number value).

At step 230, a determination is made as to whether a multi-viewer basis was selected for analysis at block 228 and, if not, then at step 232, a first specified portion of the accessed content is categorized (i.e. by genre of work) and, optionally, characterized (e.g., as evoking a particular emotional response or holding/not holding the attention of viewers) on the basis of a singular user. Otherwise, categorization and/or characterization occurs at step 234 on the basis of the aggregated reactions of many users. If for example, it is determined that the majority of those accessing the content were laughing at a particular scene or element, as evidenced by detected mouth movements and, optionally, sound analysis, then a "funny" characterization is applied to that portion and a "comedy" categorization is applied. On the other hand, if the eyes of the users remained wide open (i.e., "glaring") and the head did not turn away for the duration of the scene, then a "high audience interest level" characterization and/or an "action/suspense" categorization is applied. If a person looked away and an audible outburst (i.e., a scream) by a viewer was captured as a reaction to a particular portion of the video, then this video might receive a categorization of "horror".

In any event, and with continued reference to the illustrative embodiment of FIG. 2B, it will be seen that at step 236, it is determined whether or not a pre-defined category was defined for the particular portion being analyzed, or for the work as a whole. If so, then at step 238, this pre-defined category is compared with the categorization obtained at step 232 (reaction of a single viewer case) or at step 234 (reaction of multiple viewers case). If at step 238 it is determined that the particular scene or content element does not match the predefined category, an indication of this is stored at step 240 for inclusion in a report to be generated for the user, or added as a notation along a displayed time line for further investigation by the user. If there is a match at step 238, or if there was not predefined category or item specified, then the method proceeds to step 242. If there are additional scenes, elements or other portions of the display content to be analyzed then the process returns to step 230. Otherwise, the process continues to step 244 at which point an overall genre classification is assigned to the content item or portion specified at block 226, and then the process terminates at step 246.

FIG. 3 depicts a flow diagram of a method 300 for using received user reaction data for sentiment analysis, as performed by the index analyzer 126, the heat map generator 116 and report generator 118 of FIG. 1, according to one or more embodiments. The method 300 receives a request to view reaction data for a video and using a crowd-sourced sentiment analysis, provides the reaction data according to filter criteria specified by a user. The method 300 starts at step 302 and proceeds to step 304.

At step 304, the method 300 receives a request to view/access viewer reaction analysis corresponding to a particular video or display content comprising a video portion. In some embodiments, a request to view the video is interpreted as a request to view the video with an accompanying indicator of interest for each portion of the video. In some embodiments, a user interface is provided that allows a user to select a type of report of the reaction data that the user would like to view.

The method 300 proceeds to step 306, where the method 300 accesses user reaction data collected from all previous users whose reactions are stored as reaction data. The reaction data is stored for each portion of the video. For each user, the reaction data includes interest index and individual emotional state index for each portion of the video. An individual emotional state index is calculated in a manner similar to the interest index described earlier. A particular lip shape, for example, is determined to be associated with a serious or sad emotional state while another may be associated with a happy emotional state. The direction in which a user's head or gaze is turned can either magnify or have a neutral effect on emotional index weighting.

The method proceeds to step 308 where one or more filter criteria are optionally applied. For example, an individual or entity seeking access to sentiment analysis according to embodiments of the invention may be more interested in a particular socio demographic group. Accordingly, filter criteria such as user age, race, economic strata, and residence may be applied if such information has been provided by the user or is otherwise available through some other means. The method 300 extracts the interest and emotional state index for each portion of the video for each user which satisfies the filter criteria. The filtering criteria can include other options such as including only video portions pre-identified as corresponding to a particular genre or having a defined significance as compared to other portions. In some embodiments, no filtering is performed at all and all available user reaction data is utilized for sentiment analysis. At step 310, the interest and emotional state indices which satisfying the applicable filter criteria are aggregated.

The method 300 proceeds to step 314. At step 314, the method 300 calculates an aggregate interest index for each portion of video. According to an embodiment, an aggregate interest index is computed as the average of all users (or of a filtered subset of users as described earlier). For example, if a portion of the video was viewed by three users, where two users had interest indices of +10.0 and one user had an interest index of −10.0, the average interest index for the portion of video is calculated as (10.0+10.0−10.0)/3=3.33. The method 300 calculates an average interest index for each portion of the video for which data exists in the reaction data. According to other embodiments, the respective interest indices are weighted and aggregated in accordance with user selectable options.

The method 300 proceeds to step 316, where the aggregate indices are associated with respective portions of the video. At step 318, the indices are mapped to a graphical representation which is displayed or otherwise presented at step 320 to a user. The process of option A to method 300 terminates at step 322.

In some embodiments, the graphic representations made available by method 300 include color-coding to represent an average interest index for each portion of the video. A specific color may be associated with a range of interest index values. For example, the method 300 uses varying shades of red and green to represent the average interest indices. The method 300 uses red to represent negative interest indices and uses green to represent positive interest indices. A shade of the red or green identifies a magnitude of interest. For example, interest indices in the range of −10.0 to −5.0 are dark red. Interest indices in the range of −5.0 to 0.0 are light red. Interest indices in the range of 0.0 to +5.0 are light green. Interest indices in the range of +5.0 to +10.0 are a dark green.

In some embodiments, the method 300 generates a heat map to indicate interest in each portion of the video. In order to create a heat map, the method 300 color codes, for example a timeline associated with the video. While the video is playing, the heat map is displayed on the timeline along with the video, as a transparent overlay over the video, or the like. In this way, the user can readily identify and distinguish those portions of the video which were of interest to previous users and those portions of video found to be of less interest.

In some embodiments, the method 300 provides a user interface that allows a user to view the indication of interest for the video in a report. The report may be in the form of a table, or a graph of any kind. The report may be color coded using the indicia of interest. The method 300 provides an interface for the user to select a video and a type of report. The method 300 then accesses the reaction data. The method 300 can provide the reaction data in a table that identifies, for example, an identification of a portion of the video, a most common user reaction to the portion of the video, an average interest index for the portion of the video, the type of content displayed in the portion of the video, a most common demographic of who viewed the portion of the video, and the like. Any metrics that are included in the reaction data may be selected for display in the table that indicates an interest in the portions of the video. If a user opts to view a graph of the reaction data, for example a line graph or a bar graph, the method 300 calculates the average interest index for each portion of the video and displays a graph of the average interest index against an axis of portions of the video.

FIG. 4 illustrates a sample of data 400 collected for three users of a video in accordance with an embodiment of the present invention. The reaction data 400 includes user reaction data 402 from user1, user reaction data 404 from user2, and user reaction data 406 from user3. The user reaction data 402, 404, 406 identifies a video portion 408 for which the user reaction was taken, where the length of each portion is 30 seconds. The user reaction data 402, 404, 406 also includes a user reaction 410, an interest index 412, and a content identifier 414.

User reaction data 402 indicates that user1 showed interest in the video from time 0-210, with interest indices of +10.0 for each video portion 408. However user1 showed a lack of interest in the video from time 210-300, when the user closed his eyes and eventually turned his head away.

User reaction data 404 indicates that user2 did not show an interest during the first thirty seconds (i.e., time 0-30) of the video as his head was turned away, User2 stayed interested in the video until the last 30 seconds (i.e., time 270-300), when the user turned his head away again.

User reaction data 406 indicates that user3 showed interest in the video from time 0-90, with interest indices of +10.0 for each video portion. However, user 3 closed his eyes during advertisement 1, indicating a lack of interest with an interest index of −10.0. User3 showed interest in the video again from time 120-240, with interest indices of +10.0. However, for the time 240-300 in which advertisement 2 was played, user3 turned his head away, resulting in interest indices of −10.0 for the duration of the advertisement 2.

Figure 5:
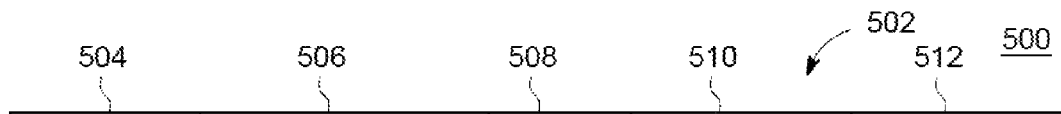
FIG. 5 illustrates a sample report of consolidated user reactions in the form of a table, in accordance with an embodiment of the present invention.

FIG. 5 illustrates a sample report 500 of consolidated user reactions in the form of a table, in accordance with an embodiment of the present invention. The table 502 consolidates the user reaction data from FIG. 4. The table 502 identifies a video portion 504, user reaction 506, average interest index 508, content identifier 510, and a demographic 512. The average interest index 508 is an average calculated for each video portion 503 using the interest index from the user reaction data in FIG. 4.

Figure 6:
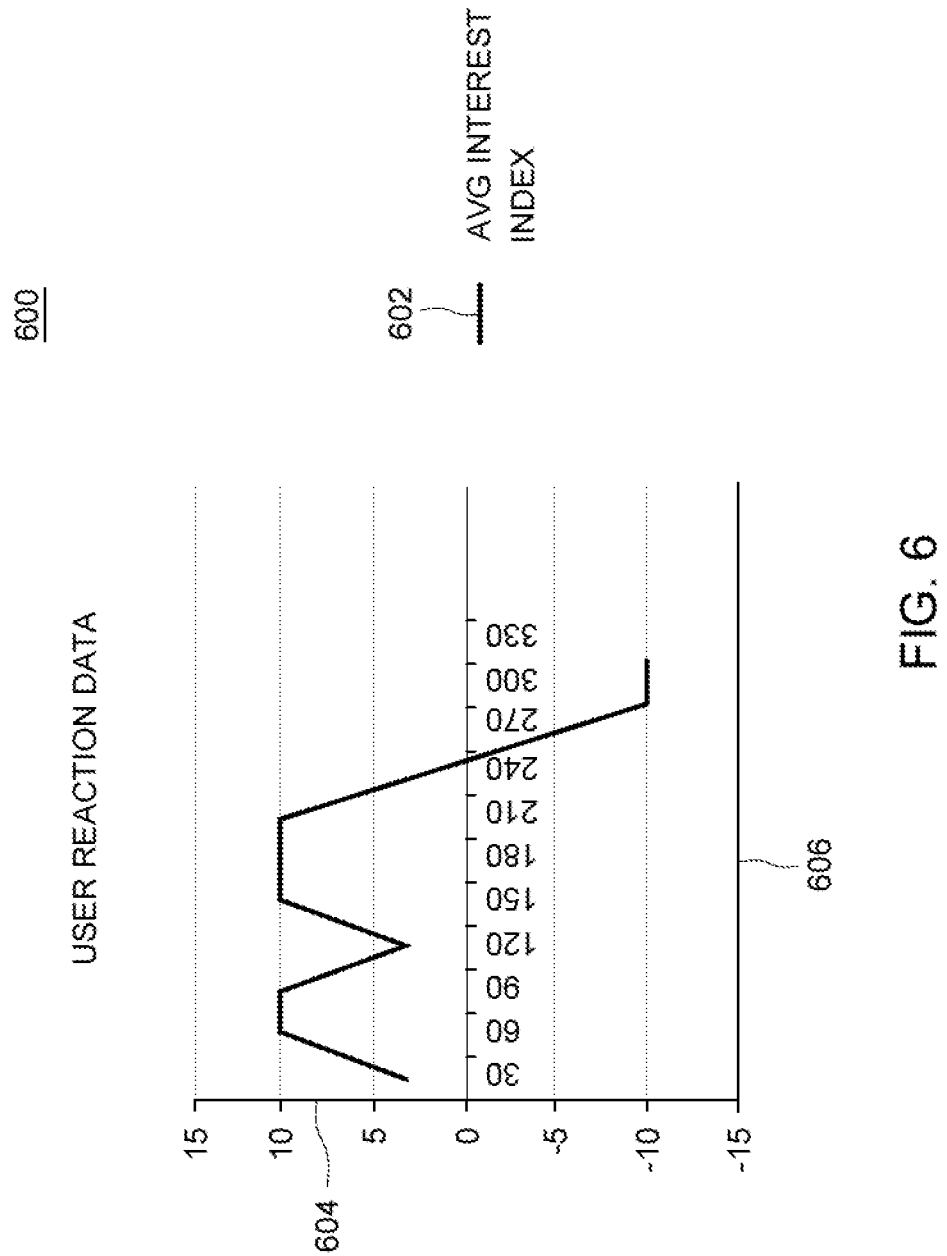
FIG. 6 illustrates a sample report of consolidated user reactions in the form of a graph, in accordance with an embodiment of the present invention.

FIG. 6 illustrates a sample report 600 of consolidated user reactions in the form of a graph, in accordance with an embodiment of the present invention. The calculated average index indices 602 from the table 502 in FIG. 5 are displayed along the vertical-axis 604 in relation to the video portions displayed along the horizontal-axis 606. The report 600 shows the differences in interest for the portions of the video, with a marked lack of interest at the end of the video during time 270-300 when the advertisement 2 was played.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
receiving reaction data of a plurality of users, the reaction data comprising indications representative of at least one of an emotional state of a user and a level of interest of the user captured during viewing of displayable content;
identifying at least one portion of the displayable content to which at least one user had a reaction;
aggregating the reaction data of at least some of the plurality of users to obtain aggregated reaction data; and
categorizing portions of the displayable content based on one of a reaction of one user or aggregated reactions of the at least some of the plurality of users.

2. The method of claim 1, wherein receiving reaction data of the plurality of users comprises receiving a time-indexed record derived from detected instances of at least one user behavior.

3. The method of claim 2, wherein the at least one user behavior includes a facial expression of each user detected as a response to viewing the displayable content.

4. The method of claim 1, further comprising:
executing a filtering expression on the aggregated reaction data to ignore or include particular user reactions based on a majority of users having one of a similar or a different reaction to a same portion of the displayable content; and
graphically depicting a timeline of displayable content viewership, based on the filtered aggregated reaction data, to show a common reaction of a majority of users watching the same portion of the displayable content.

5. The method of claim 1, further comprising:
classifying respective portions of the displayable content as corresponding to one of a plurality of content genre categories; and
graphically depicting a timeline of displayable content viewership, based on the aggregated reaction data, to identify classified respective portions which are at least one of consistent or inconsistent with user reaction based on the aggregated reaction data.

6. The method of claim 1, wherein receiving reaction data further comprises:
receiving a generated interest index of at least one user of the plurality of users who has viewed a plurality of portions of a video, wherein the interest index is generated based on the user's reaction to a portion of the video, as monitored by a camera, the method further comprising generating indicia of interest of the user for each portion of the video based on the interest index.

7. The method of claim 1, further comprising determining a user reaction for at least one user of the plurality of users, the determining comprising:
accessing an output from a camera;
performing facial detection and motion detection on the output to identify changes in at least one of eye movements, head movements, or facial expressions of the at least one user; and
mapping the changes in eye movement, head movement and or facial expressions to user reactions.

8. The method of claim 7, further comprising:
assigning a predefined point value to each user reaction; and
when two or more user reactions are observed during a portion of video, calculating an interest index for the portion of video by adding the predefined point value for each of the two or more user reactions.

9. The method of claim 1, wherein a more favorable user reaction is one in which the user has one of a higher level of interest in a portion of the displayable content or a positive emotional response to a portion of the displayable content as compared to a baseline, and wherein a less favorable user reaction is one in which the user has one of a lower level of interest or a negative emotional response to a portion of the displayable content as compared to a baseline.

10. An apparatus for performing sentiment analysis based on aggregated user reaction data comprising:
at least one processor; and
at least one non-transitory computer readable medium storing instructions that, when executed by the at least one processor, cause the apparatus to:
receive reaction data of a plurality of users, wherein the reaction data of each user of the plurality of users includes indications representative of at least one of an emotional state of a user or a level of interest of the user captured during viewing of displayable content;
determine a user reaction for each user of the plurality of users by performing acts comprising:
accessing an output from a camera;
performing facial detection and motion detection on the output to identify changes in at least one of eye movements, head movements, or facial expressions of the user; and
mapping the changes in eye movement, head movement, or facial expressions to user reactions;
associate indications of multiple users with common portions of the displayable content;
identify at least one portion of the displayable content to which at least one user had a reaction; and categorizing portions of the displayable content based on aggregated reactions.

11. The apparatus of claim 10, further comprising instructions that, when executed by the at least one processor, cause the apparatus to:
generate a heat map; and
display the heat map with the displayable content.

12. The apparatus of claim 11, further comprising instructions that, when executed by the at least one processor, cause the apparatus to:
assign a predefined point value to each user reaction; and
when two or more user reactions are observed during a portion of video, calculate an interest index for the portion of video by adding the predefined point value for each of the two or more reactions.

13. The apparatus of claim 11, further comprising instructions that, when executed by the at least one processor, cause the apparatus to:
receive an interest index of the plurality of users when the displayable content is viewed by the plurality of users, and wherein generating the heat map comprises:
calculating an average interest index based on interest indices of each user of the plurality of users for each portion of the displayable content;
mapping the average interest index to a graphical representation of the averaged interest index; and
generating the heat map based on the graphical representation of the averaged interest indices for each portion of the displayable content.

14. The apparatus of claim 13, further comprising determining indicia of interest based a degree of interest in relation to other levels of interest.

15. A non-transitory computer readable medium storing instructions thereon that, when executed by at least one processor causes the at least one processor to perform a method for identifying a level of interest of a user for each portion of displayable content based on user reactions comprising:
receiving reaction data of a plurality of users, the reaction data comprising indications representative of at least one of an emotional state of a user or a level of interest of the user captured during viewing of displayable content comprising a video; at least one of:
identifying at least one portion of the displayable content to which at least one user had a reaction; or
categorizing portions of the displayable content based on one of a reaction of one user or aggregated reactions of the plurality of users; and
displaying an indicia of interest for portions of the video when the video is played.

16. The non-transitory computer readable medium of claim 15, wherein displaying the indicia of interest comprises:
generating a heat map for each portion of the video; and
displaying the each heat map with a corresponding portion of the video.

17. The non-transitory computer readable medium of claim 16, further comprising instructions that, when executed by the at least one processor, cause a computer system to determine a user reaction by:
accessing an output from a camera;
performing facial detection and motion detection on the output to identify changes in at least one of eye movements, head movements, or facial expressions of the user; and
mapping the changes in eye movement, head movement or facial expressions to user reactions.

18. The method of claim 1, further comprising:
generating a heat map, the generating comprising:
calculating an average interest index for each portion of the displayable content based on interest indices of at least some of the users of the plurality of users;
mapping the average interest index for each portion of the displayable content to to a graphical representation of the averaged interest index; and
generating the heat map based on the graphical representation of the averaged interest index for each portion of the displayable content; and
displaying the heat map with the displayable content.

19. The method of claim 1, wherein receiving the reaction data of the plurality of users comprises receiving reaction data captured during viewing of a video by at least one user of the plurality of users.

20. The non-transitory computer readable medium of claim 15, further comprising instructions that, when executed by the at least one processor, cause a computer system to aggregate reaction data of at least some of the plurality of users.

* * * * *